R. H. BLACKALL.
BACK-OFF RATCHET.
APPLICATION FILED JULY 23, 1915.

1,167,262.

Patented Jan. 4, 1916.
2 SHEETS—SHEET 1.

INVENTOR
Robert H. Blackall
BY
Pennie Davis & Marvin
ATTORNEYS

R. H. BLACKALL.
BACK-OFF RATCHET.
APPLICATION FILED JULY 23, 1915.
1,167,262.
Patented Jan. 4, 1916.
2 SHEETS—SHEET 2.
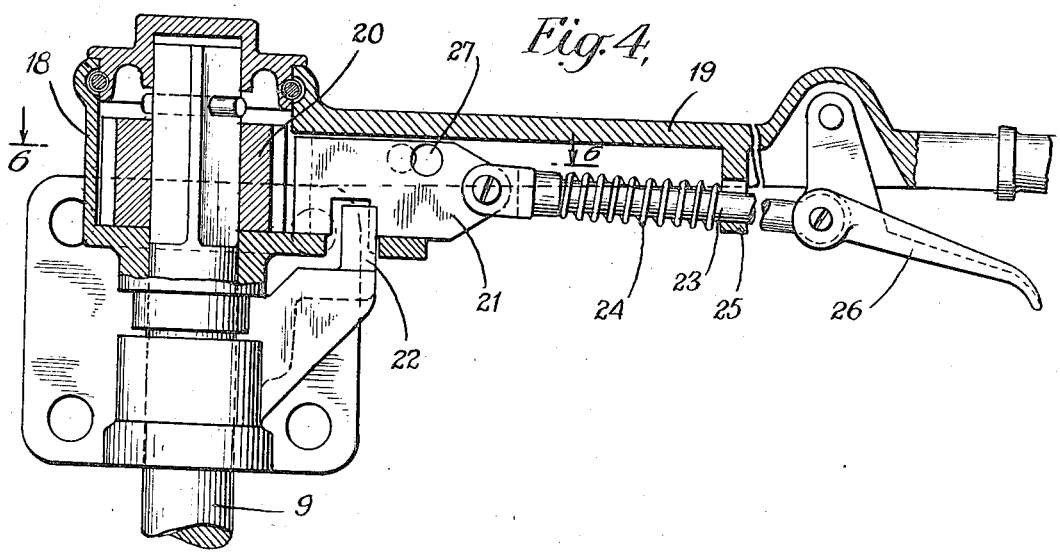
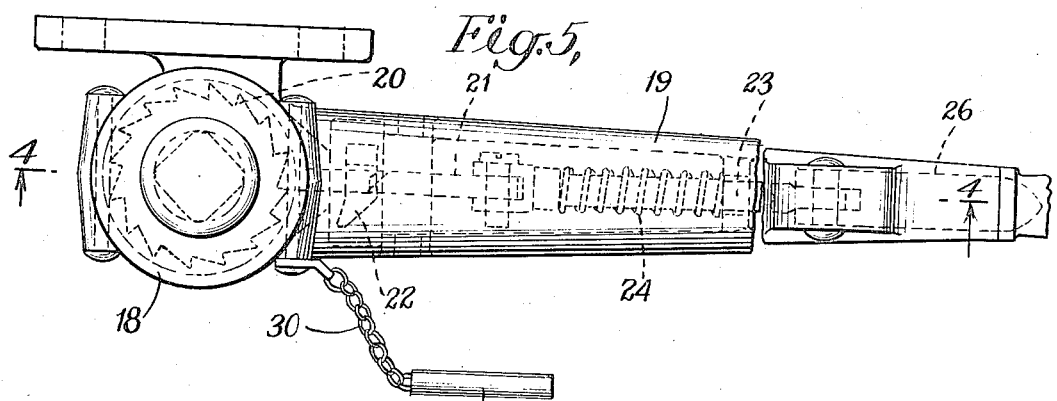
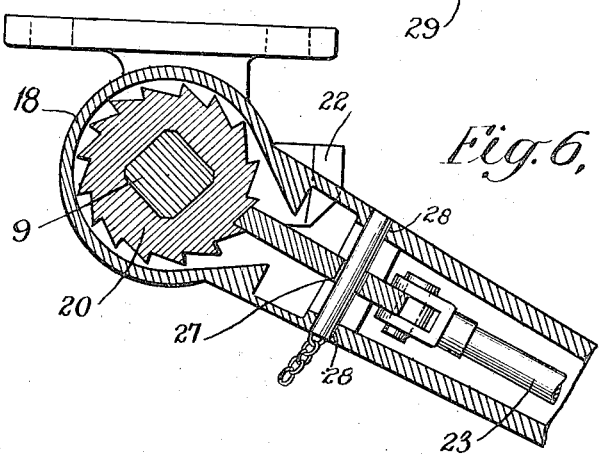
INVENTOR
Robert H. Blackall
BY
Pennie Davis & Marin.
ATTORNEYS

UNITED STATES PATENT OFFICE.

ROBERT H. BLACKALL, OF PITTSBURGH, PENNSYLVANIA, ASSIGNOR TO RATCHET BRAKE COMPANY, OF NEW YORK, N. Y., A CORPORATION OF DELAWARE.

BACK-OFF RATCHET.

1,167,262.      Specification of Letters Patent.      Patented Jan. 4, 1916.

Application filed July 23, 1915. Serial No. 41,473.

*To all whom it may concern:*

Be it known that I, ROBERT H. BLACKALL, a citizen of the United States, residing at Pittsburgh, county of Allegheny, State of Pennsylvania, have invented certain new and useful Improvements in Back-Off Ratchets; and I do hereby declare the following to be a full, clear, and exact description of the invention, such as will enable others skilled in the art to which it appertains to make and use the same.

This invention relates to hand actuated brake mechanism of the type in which an oscillating movement of an operating lever or handle is converted into a brake-applying movement of the brake shaft or staff through the medium of a suitable clutch mechanism. The clutch mechanism, as ordinarily constructed in such devices, comprises a clutch member secured to the brake shaft and a second clutch member carried by the operating lever or handle and adapted to be moved into operative engagement with the clutch member on the brake shaft when the brakes are to be set, and out of engagement therewith when the brakes are to be released. A foot pawl holds the staff against reverse rotation while the ratcheting is being effected. In devices of this type, it sometimes happens that the brake chain, after having been wound on the staff, will become tangled or jammed against the shaft support and fail to unwind properly. At such times, it is desirable to impart a positive reverse or brake-releasing movement to the shaft in order to effect a proper release of the brakes.

The object of this invention is to provide simple and efficient means for imparting a reverse or brake-releasing movement to the brake shaft when the operating lever or handle is of the ratchet type above indicated.

More specifically, the invention consists in providing means for locking the clutch member carried by the hand lever against movement when it is in engagement with the clutch member on the shaft so that when the lever is moved in the reverse direction, relative movement of the clutch members will be prevented and reverse movement of the lever will effect a rotary movement of the shaft in the brake-releasing direction.

Figure 1:
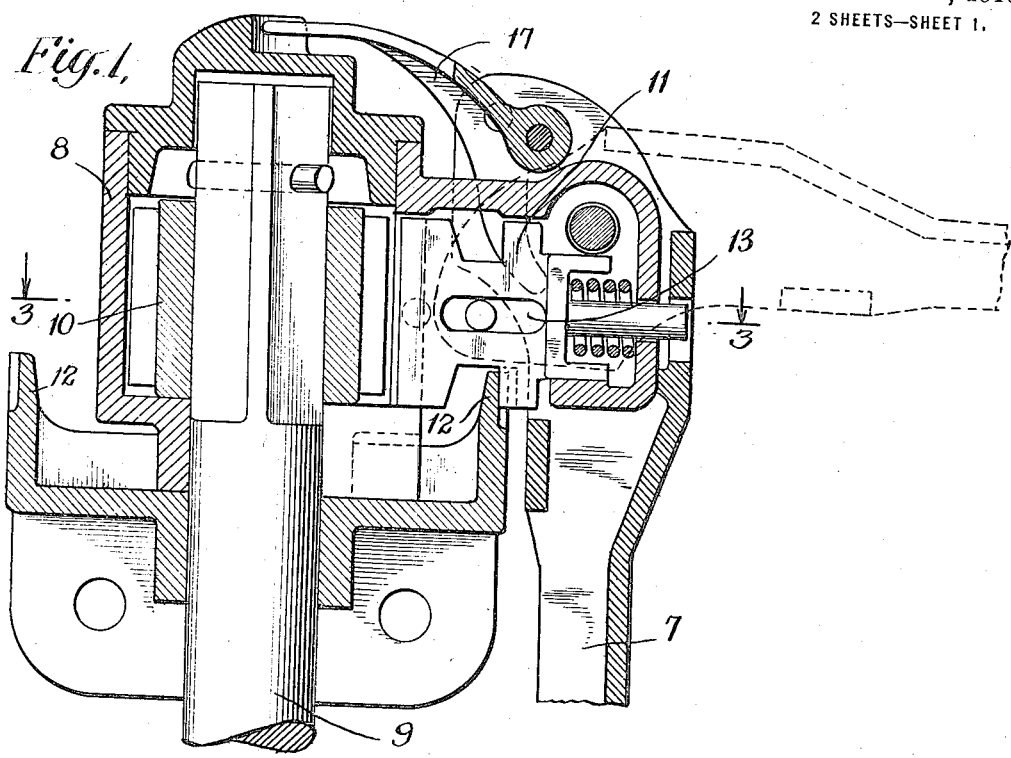
Figure 2:
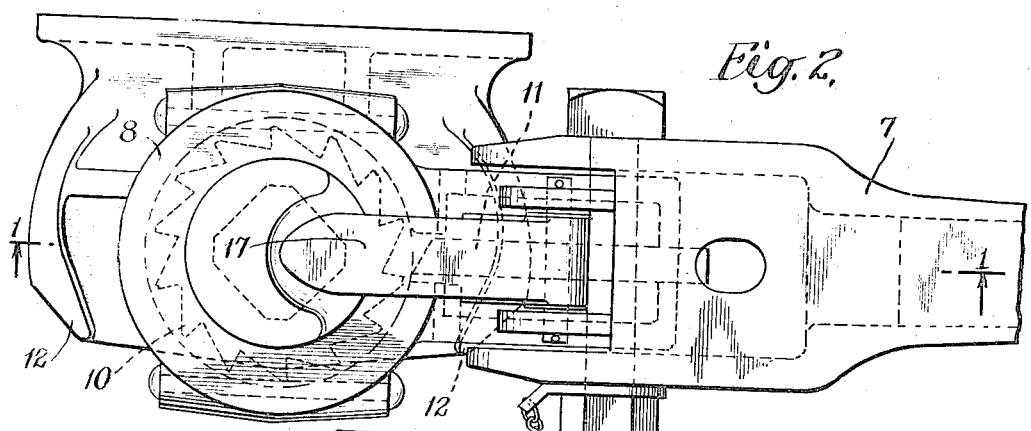
Figure 3:
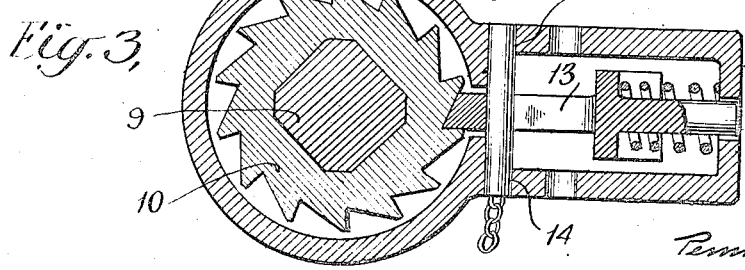

In the accompanying drawings, illustrating an embodiment of the invention, as applied to two different types of hand actuated brake mechanism, Figure 1 is a sectional view on the line 1—1 of Fig. 2, showing the invention in connection with hand actuated brake mechanism of one type; Fig. 2 is a plan view thereof; Fig. 3 is a detailed sectional view taken on the line 3—3 of Fig. 1, showing the clutch members locked against relative movement; Fig. 4 is a sectional view taken on the line 4—4 of Fig. 5, showing the invention as applied to a different type of hand actuated brake mechanism; Fig. 5 is a plan view thereof; and Fig. 6 is a detailed sectional view taken on the line 6—6 of Fig. 4, showing the clutch members locked against relative movement.

Referring to Figs. 1, 2 and 3 of the drawings, the invention is shown in connection with hand actuated brake mechanism of the general type described in my U. S. Letters Patent No. 1,066,702, dated July 8, 1913. Briefly described, this mechanism has an oscillating operating lever, comprising a handle 7, which may be a drop handle, and a hub or housing 8 which is rotatable with respect to the brake shaft 9 and to which handle 7 is pivoted. The oscillating movement of the lever rotates the brake shaft by means of a clutch mechanism consisting of a ratchet 10 secured to the shaft and a spring-pressed pawl 11 carried by the lever and adapted to be moved into and out of engagement with the ratchet. Two pawl disengaging elements 12 are positioned on opposite sides of the center of oscillation of the handle, each of which is adapted to serve as a disengaging device and as a limiting stop. By inverting the pawl and ratchet the operating lever can be arranged to work right-handedly or left-handedly, and in either case one of the elements 12 will disengage the pawl from the ratchet when the lever is moved back to its extreme or releasing position and the other element 12 will limit the movement of the handle in the other direction. Under normal conditions, when the lever is moved forward, the pawl 11 will engage the teeth of the ratchet 10 and rotate the shaft 9 to set the brakes. When the lever is moved in the opposite direction, the pawl will ride over the teeth of the ratchet without rotating the shaft, the shaft being held against reverse rotation by the usual foot pawl, not shown, or its equivalent. In order to permit the brakes to be released by a positive rotation of the shaft 9 when the lever is moved in its reverse direction, means are provided for locking the pawl or clutch member 11 in engagement with the ratchet or clutch member 10. As shown, this result is attained by providing the pawl with a hole 13, which is adapted to register with holes 14 formed in the hub or housing 8 when the pawl is in its innermost or ratchet-engaging position. The pawl may then be locked in this position by inserting a pin 15 through the holes 14 and the hole 13, as shown in Fig. 3. The pin is preferably secured to the lever by a chain 16 in order that it will be handy for use. Normally, the pawl is held out of engagement with the ratchet by means of one of the elements 12 and the handle 7 is in its lowered position out of the way, as shown in Fig. 1. When it is desired to set the brakes, the handle is raised to its horizontal position, as indicated in dotted lines in Fig. 1, and the lever is then oscillated in the usual manner, it being understood that when it is moved forward from its normal position, the pawl 11 will engage the ratchet 10. After the brakes are set, the lever is returned to its normal position, the shaft being held against rotation by the usual locking or foot pawl and ratchet, not shown. When it is desired to release the brakes, the locking pawl is released from its ratchet in the usual manner. Should, however, the brake chain become tangled on the shaft or wedged against the shaft support, so as to prevent the shaft from turning to release the brakes, it will then be necessary to positively back-off the brake shaft. This is accomplished by moving the operating lever forward from its normal position, meantime holding the pawl out of engagement with the ratchet by means of the usual releasing lever 17, after which the pawl is allowed to engage the ratchet in an advanced position and the pin 15 is inserted in the holes 14 of the handle and the hole 13 of the pawl to lock the pawl in engagement with the ratchet, as above described. When the members of the clutch are so locked against relative movement, the lever may be actuated to positively rotate the shaft 9 in a direction to unwind the chain, thereby releasing the brakes, or the handle may be jerked from side to side to untangle the chain or otherwise free the staff and its adjuncts. A graduated or progressive release of the brakes may also be attained by means of the pawl releasing lever 17 in a manner well understood in the art.

Referring to Figs. 4, 5 and 6, the invention is shown in connection with the well known Lindstrom type of hand-actuated brake mechanism of the general character shown and described in U. S. Letters Patent Nos. 574,549, dated January 5, 1897, and 578,573, dated March 9, 1897. This type of mechanism has an oscillating operating lever comprising a hub portion 18 and a handle portion 19 secured thereto, the hub being rotatable with respect to the brake shaft 9. Oscillating movement of the lever rotates the shaft 9 by means of a clutch mechanism comprising a ratchet 20 secured to the shaft, and a pawl 21 carried by the lever and adapted to be moved into and out of engagement with the ratchet. A pawl disengaging element 22 is so positioned as to disengage the pawl from the ratchet when the lever is moved back to its extreme position. The pawl 21 is mounted upon a rod 23 and is urged forward into its ratchet engaging position by means of a spring 24 surrounding the rod 23 and engaging a bracket 25 formed on the handle 19. A pawl releasing lever 26 pivoted to the handle 19 is secured to the outer end of the rod 23 in order to withdraw the pawl from engagement with the ratchet if desired. In order to permit the shaft to be rotated to release the brakes, should the brake chain become tangled on the shaft or wedged against the shaft support, the pawl is provided with a hole 27 adapted to register with holes 28 formed in the lever when the pawl is in its innermost or ratchet engaging position. The pawl may then be locked in position by inserting a pin 29 through the holes 28 and the hole 27. In order that the pin may be handy for use, it is preferably secured to the lever by a chain 30. The lever normally occupies the extreme backward position in which the pawl 21 is held out of engagement with ratchet 20 by means of the element 22. When it is desired to set the brakes, the lever is oscillated in the usual manner, it being understood that as it is moved from its normal position, the pawl will engage the ratchet and will rotate the shaft 9 when the lever is moved in a forward direction. On the reverse movement of the lever, the pawl will ride over the teeth of the ratchet without rotating the shaft. After the brakes are set, the lever is returned to its normal position, the shaft being held against rotation by the usual locking or foot pawl and ratchet, not shown. Should the brake chain become entangled or wedged so that the shaft 9 will not rotate when the locking pawl is released, the shaft may be positively rotated to release the brakes by first moving the lever from its normal position while holding pawl 21 out of engagement with its ratchet, then allowing it to engage the ratchet in an advanced position, and then inserting the pin 29 through the holes 28 in the lever and the hole 27 in the pawl, thereby locking the clutch members against relative movement. When the parts are so locked, the lever may be actuated to positively rotate the shaft 9 in a direction to unwind the chain and release the brakes.

I claim:

1. In a hand-actuated brake mechanism, in combination, a brake shaft, an oscillating lever, co-acting clutch members carried by the shaft and the lever to rotate the shaft when the lever is moved in one direction, one of the clutch members being movable relatively to the other when the lever is moved in the reverse direction, and means to lock the clutch members together, whereby movement of the lever in the reverse direction will positively rotate the shaft backward.

2. In hand-actuated brake mechanism, in combination, a brake shaft, a ratchet member secured thereto, an oscillating lever, a pawl carried thereby and operatively engaging said ratchet member to rotate the shaft when the lever is moved in one direction, the pawl moving over the teeth of the ratchet member when the lever is moved in the reverse direction, and means to lock the pawl to the ratchet, whereby movement of the lever in the reverse direction will rotate the shaft backward.

3. In hand-actuated brake mechanism, in combination, a brake shaft, a clutch member secured thereto, an oscillating lever, a clutch member carried thereby and movable into and out of engagement with the first mentioned clutch member, and means to lock the second clutch member against movement relatively to the first mentioned clutch member when in engagement therewith.

4. In hand-actuated brake mechanism, in combination, a brake shaft, a clutch member secured thereto, an oscillating lever, a clutch member carried thereby and movable into and out of engagement with the first mentioned clutch member, and means engaging the lever and the clutch member carried thereby to lock the latter against movement relatively to the first mentioned clutch member when in engagement therewith to permit positive backward rotation of the brake staff.

5. In hand-actuated brake mechanism, in combination, a brake shaft, a clutch member secured thereto, an oscillating operating lever, a clutch member carried thereby and movable into and out of engagement with the first mentioned clutch member, the lever having an opening formed therein, the second mentioned clutch member having an opening formed therein adapted to register with the opening in the lever when said clutch member is in engagement with the first mentioned clutch member, and a pin adapted to be inserted through the registering openings to lock the second mentioned clutch member in engagement with the first mentioned clutch member.

6. In hand-actuated brake mechanism, in combination, a brake shaft, a ratchet secured thereto, an oscillating operating lever, a pawl carried thereby and movable into and out of engagement with the ratchet, and means to lock the pawl in its ratchet engaging position.

In testimony whereof I affix my signature.

ROBERT H. BLACKALL.